United States Patent [19]

Beresky et al.

[11] 4,013,446
[45] Mar. 22, 1977

[54] METHOD FOR PREVENTING CREASING IN CITRUS FRUIT

[75] Inventors: Aharon Beresky, Haifa; Avigdor Bar-Akiva, Rishon Le-Zion, both of Israel

[73] Assignee: Fertilizers & Chemicals Ltd., Haifa, Israel

[22] Filed: Aug. 5, 1975

[21] Appl. No.: 602,170

[30] Foreign Application Priority Data

Dec. 20, 1974 Israel .................... 46307

[52] U.S. Cl. .................... 71/86; 71/29; 71/36; 71/58; 71/65; 71/89
[51] Int. Cl.² .................... A01N 9/36
[58] Field of Search .................... 71/86, 29

[56] References Cited

UNITED STATES PATENTS

| 2,036,870 | 4/1936 | Harvey | 71/29 |
| 3,087,806 | 4/1963 | Martin | 71/29 |
| 3,713,801 | 1/1973 | Greidinger et al. | 71/29 |

OTHER PUBLICATIONS

Jones, "Biuret toxicity of urea foliage sprays, etc.," (1954) CA 49 p. 2568 (1954).
Jones et al., "Leaf sprays of urea as a source of etc.;" (1952) CA 47 p. 3503 (1953).
Okuda et al., "Foliar absorption of nutrients etc.;" (1960) CA 61 pp. 11019–11020 (1964).

*Primary Examiner*—Glennon H. Hollrah
*Attorney, Agent, or Firm*—John S. Roberts, Jr.

[57] ABSTRACT

The invention relates to a method for a significant reduction of creasing in citrus fruit. The method consists in applying an aqueous solution of urea phosphate to the citrus fruit. The urea phosphate can be applied alone or together with other conventional ingredients, micronutrients or fertilizers.

3 Claims, No Drawings

METHOD FOR PREVENTING CREASING IN CITRUS FRUIT

The present invention relates to a method for preventing creasing in citrus fruit.

Creasing is considered a physiological disorder which appears as a peel defect in certain citrus fruit. In the last seventy years, the peel defects in citrus fruit have been recognized as a serious problem. The fundamental cause of creasing is as yet unknown but, in the last twenty years, some factors have been elucidated which affect this creasing disorder. It has been observed that, during the ripening process of the citrus fruit, creasing is manifested as internal cavities in the albedo and these impart a wrinkled appearance to the citrus fruit. It was also assumed that creasing may result from the contraction, both longitudinal and transversal, of the elongated and branched cells of the albedo, the cause of which is unknown.

While no creasing has been reported in the thick-peeled varieties of citrus fruit such as grapefruit and pummelo, this physiological disorder is encountered in several species of oranges with thin peel such as Valencia, Washington, Hamlin etc. The creasing was found to occur on the side of the fruit, towards the centre of the citrus tree, being more pronounced in the smaller fruit.

A number of reports published in the last 20 years show that, by spraying the citrus tree with potassium nitrate, a partial reduction is achieved in the appearance of creasing. It was found that the presence of potassium increases the peel thickness of the citrus and thus, to a certain extent, reduces the creasing in the fruit. However, it was surprisingly found that the thinner peels are higher in potassium ion than the thicker peels and that the peels of the creased fruits contained more potassium than the non-creased fruit. It seems that creasing cannot be directly correlated with potassium deficiency and, accordingly, it cannot be expected that this physiological disorder might be avoided by spraying with a potassium ion-containing solution. It was suggested that potassium nitrate sprays eliminate only one of the factors responsible for the appearance of creasing while there are other factors which still affect this disorder in the fruit.

Other reports show that foliar applications of ammonium ion reduce the creasing in the fruit. The explanation is perhaps connected with the chemical similarity between the $NH_4^+$ ion and its ability to replace $K^+$ partly or entirely in the metabolical function. Results which were reported show that foliar spray applications of ammonium phosphate solution as a source of nitrogn ions were more effective than potassium nitrate sprays in reducing creasing physiological disorder in Valencia oranges. However, the ammonium phosphate sprays cause a decrease in the size of the fruit which is considered a clear disadvantage in the quality of the fruit.

From all these reports from the prior art, two basic conclusions can be drawn:
1. The prevention of creasing disorder in citrus fruit constitutes a long-felt problem in the art which, up to now, has not achieved a fully satisfactory solution and
2. The complex systems involved in the creasing disorder and the morphological changes in the peels cannot provide a sound theoretical explanation for all the phenomena which contribute to this physiological disorder and many hypotheses may be submitted.

It is the object of the present invention to provide a method for a significant reduction of creasing disorder in citrus fruit. It is another object of the present invention to provide a method for prevention of creasing disorder in citrus fruit using a simple and cheap reagent which is more convenient in use.

In accordance with the invention, a method is provided for a significant reduction of creasing in citrus fruit wherein an aqueous solution of urea phosphate is applied to the citrus tree. The preferred way of applying the urea phosphate solution is by foliar spray of an aqueous solution of urea phosphate having a concentration of at least 0.5 by weight and preferably above 1% by wt. It was unexpectedly found that urea phosphate alone gave better results in reducing the creasing of Valencia oranges to a minimum, compared with potassium nitrate, ammonium phosphate or ammonia taken separately or even together.

Urea phosphate is now a common reagent which can be easily produced in solid form as described, for example, in U.S. patent application Ser. No. 467,670 now U.S. Pat. No. 3,936,501. Another possibility to obtain aqueous solutions of urea phosphate directly is by mixing stoichiometric amounts of urea and phosphoric acid and, if necessary, diluting the aqueous product obtained to the desired concentration. Urea phosphate also competes very favourably with gibberellin which was previously used to reduce the creasing. Urea phosphate, produced according to the above U.S. Pat. No. 3,936,501 for example, is completely free of biuret, which is harmful to citrus fruit, and thus no deleterious effects are encountered in the citrus fruit on using urea phosphate.

The urea phosphate can be applied alone or together with other conventional ingredients and micronutrients which influence the growth of the citrus tree. Each of these ingredients, plus any additional growth additive reagents may be selected from the wide range of reagents used hitherto in the art. Examples of these reagents are: 2,4 D, gibberellin, Triton 1956, etc. These ingredients are generally incorporated in amounts between about 10 ppm and 1% by weight of solution.

Other known fertilizers such as salts of potassium, magnesium and ammonium i.e. potassium nitrate or phosphate, magnesium nitrate or phosphate, ammonium nitrate or phosphate and ammonia may also be incorporated in the foliar spray solutions.

The amount of urea phosphate applied to the citrus fruit is generally in the range of about 3 to 15 kg of urea phosphate per dunam of trees and preferably between about 4 to 7 kg per dunam. The improved results obtained by using urea phosphate against creasing were proved in field tests and compared with results obtained with potassium nitrate and ammonium phosphate. The comparative tests with potassium nitrate were carried out in an orchard near Tel Hashomer using foliar sprays of the following aqueous solution:
1. Potassium nitrate 5% (wt percent) + 0.025% Triton 1956 (used as a wetting agent).
2. Urea phosphate 1% (wt percent).

The foliar spraying was performed in four rows and the results obtained are given in Table 1 below:

Table 1

| The reagent used (aqueous solutions) | Number of Valencia fruits analyzed | Number of Valencia fruits affected by creasing |
|---|---|---|
| Urea phosphate (1%) | 1500 | 21 |
| Potassium nitrate (5%) | 1000 | 36 |
| Control | 1500 | 118 |

Although the tests were carried out in a season when creasing disorder was not widespread, the above results clearly show the creasing incidence decrease in trees treated with urea phosphate: 14 fruits creased per 1000 fruits analyzed, compared with the treatment with potassium nitrate where 36 fruits creased per 1000 fruits analyzed, while 78 fruits creased per 1000 fruits analyzed in untreated trees.

Other comparative tests were performed in an orchard near Rechovot, using foliar sprays of the following aqueous solutions:
1. Ammonium phosphate 3% (wt percent) + ammonia 1% (wt percent); ratio N:P in the mixture was 13–24.
2. Urea phosphate 1% (wt percent).

The results obtained are given in Table 2 below:

Table 2

| The reagent used (aqueous solutions) | Number of trees in trials | Number of fruits tested | Creasing incidence in % |
|---|---|---|---|
| Urea phosphate (1%) | 30 | 3,000 | 11.7 |
| Ammonium phosphate (3%) + ammonia (1%) | 30 | 3,000 | 16.8 |
| Control | 30 | 3,000 | 30.7 |

Here again, the improved results which are achieved with foliar sprays of urea phosphate solutions compared with ammonium phosphate + ammonia are demonstrated.

The creasing disorder varies from place to place and its intensity varies from season to season. The foliar spraying of urea phosphate solution is carried out in the same manner as with other reagents for this purpose.

In addition to the lower price compared with gibberellin, urea phosphate also has the advantage that it apparently does not affect the orange colour of the fruit significantly. Previous experiments have shown that treatment with gibberellin carried out in winter causes the colour of the fruit to remain green.

Potassium nitrate, previously suggested against creasing, is generally used in relatively large amounts (5–10%). Although potassium ion is recognized as a desired nutrient for the tree, the use of relatively large amounts also causes an increase in the potassium intake by the leaves which may disturb the metabolic balance. The antagonism which exists between potassium and magnesiums ions is well known; an increase in potassium intake causes a corresponding decrease in magnesium ion. The result of a decrease in magnesium ion may be a degradation in the quality of the fruit.

We claim:
1. A method for a significant reduction of creasing in citrus fruit wherein an effective amount of an aqueous solution of urea phosphate is applied to the citrus fruit by foliar sprays.
2. A method according to claim 1, wherein the concentration of the aqueous solution of urea phosphate is at least 0.5% by weight.
3. A method according to claim 1 wherein the citrus fruit is of the Valencia orange type.

* * * * *

UNITED STATES PATENT OFFICE
CERTIFICATE OF CORRECTION

PATENT NO. : 4,013,446
DATED : March 22, 1977
INVENTOR(S) : Aharon Beresky and Avigdor Bar-Akiva It is certified that error appears in the above-identified patent and that said Letters Patent are hereby corrected as shown below:

First page, under item 73, Assignee, there should also be listed --The Volcani Center, Agricultural Research Organization, Rishon Le-Zion, Israel--

Signed and Sealed this

Thirteenth Day of September 1977

[SEAL]

Attest:

RUTH C. MASON
Attesting Officer

LUTRELLE F. PARKER
Acting Commissioner of Patents and Trademarks